R. A. SHAVER.
ATTACHMENT FOR SEED PLANTERS.
APPLICATION FILED MAY 20, 1912.

1,044,930.

Patented Nov. 19, 1912.

2 SHEETS—SHEET 2.

Witnesses
J. R. Pierce
C. E. Hunt

Inventor
R. A. Shaver.
by H. B. Willson & Co.
Attorneys

UNITED STATES PATENT OFFICE.

RALEIGH A. SHAVER, OF PLATTSBURG, MISSOURI.

ATTACHMENT FOR SEED-PLANTERS.

1,044,930.    Specification of Letters Patent.    Patented Nov. 19, 1912.

Application filed May 20, 1912. Serial No. 698,595.

*To all whom it may concern:*

Be it known that I, RALEIGH A. SHAVER, a citizen of the United States, residing at Plattsburg, in the county of Clinton and State of Missouri, have invented certain new and useful Improvements in Attachments for Seed-Planters; and I do declare the following to be a full, clear, and exact description of the invention, such as will enable others skilled in the art to which it appertains to make and use the same.

This invention relates to attachments for seed planters and is designed especially for use in connection with corn planters.

One object of the invention is to provide an attachment of this character by means of which the planting of the corn or seed in the center of the furrow is insured and whereby the ground is slightly elevated along the center of the furrow, thus preventing the washing out of newly planted seed.

Another object is to provide an attachment of this character which will be simple, strong, and inexpensive in construction and which may be readily applied to any form of planter dropping seed in the furrow.

With these and other objects in view, the invention consists of certain novel features of construction, and the combination and arrangement of parts as will be more fully described and claimed.

Figure 1:
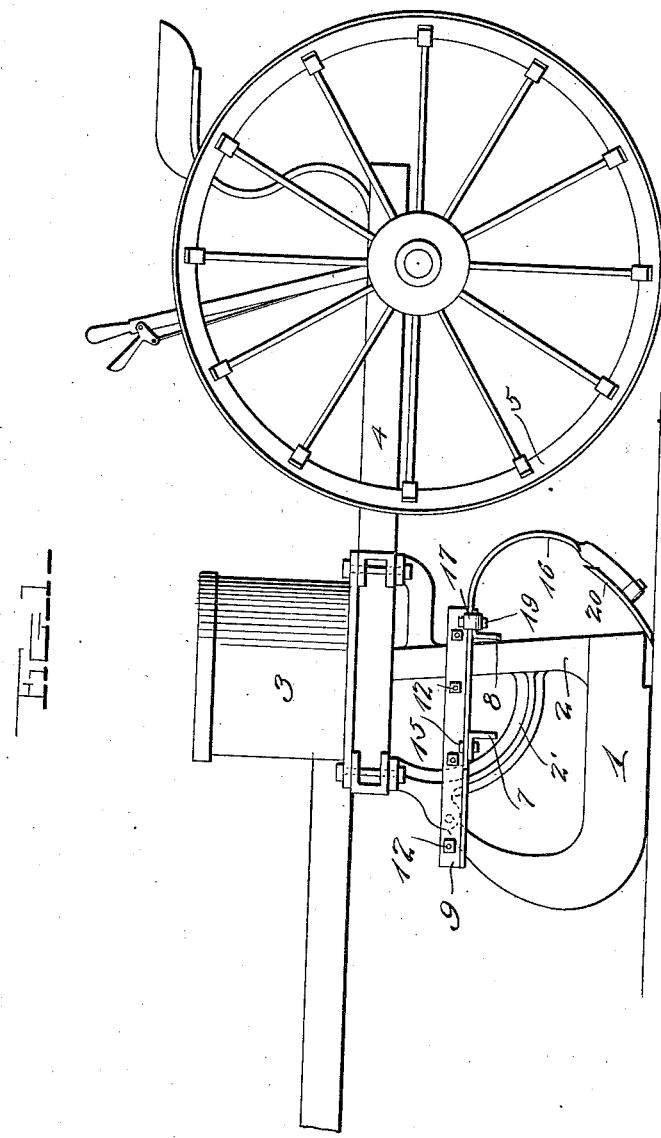
Figure 2:
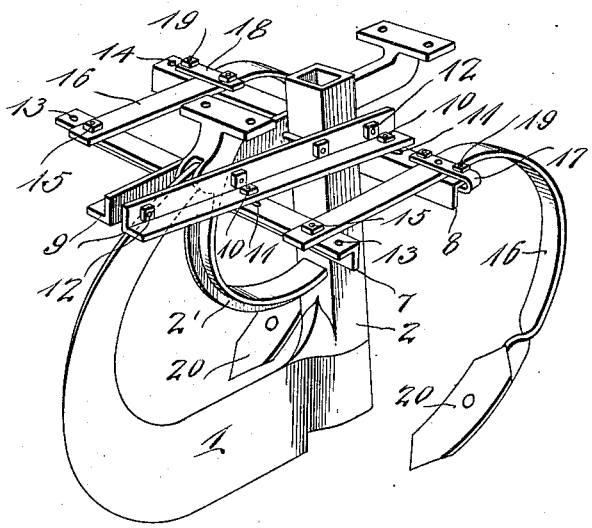
Figure 3:
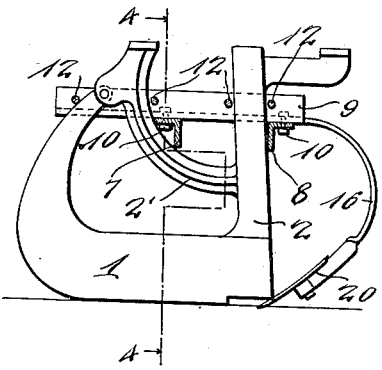
Figure 5:
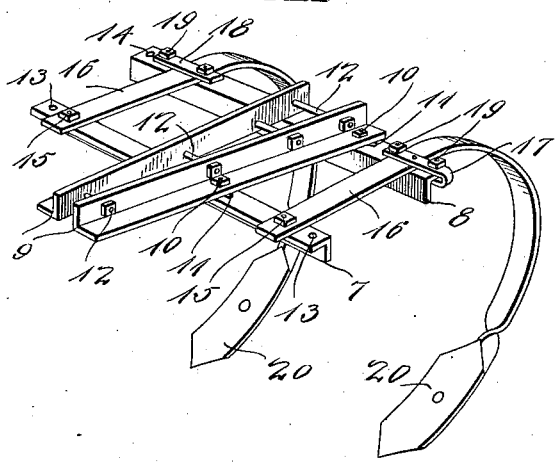
Figure 4:
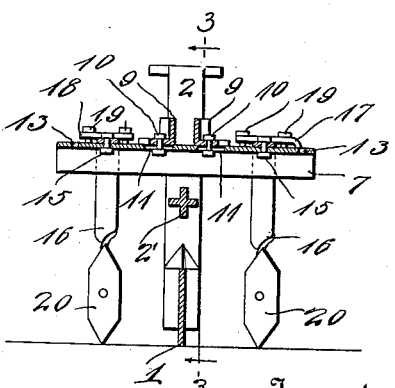

In the accompanying drawings; Figure 1 is a side view of a corn planter showing the application of the attachment; Fig. 2 is a detail perspective view of one of the furrow opening blades and seed conveying devices of the planter, showing the attachment applied thereto; Fig. 3 is a vertical sectional view of the parts shown in Fig. 2 and taken on the line 3—3 of Fig. 4; Fig. 4 is a similar view taken at right angles to Fig. 3; Fig. 5 is a detail perspective of the attachment removed from the planter.

Referring more particularly to the drawings, 1 denotes one of the furrow opening blades of the planter, 2 denotes the seed conducting tube which is connected at its upper end with the seed hopper 3 supported on the main frame 4 of the machine. Revolubly mounted in any suitable manner in the main frame 4 immediately behind and in line with the furrow opening and planting mechanism is a combined seed covering and supporting wheel 5 by means of which the seed dropped from the tube 2 into the furrow opened by the blade 1 is suitably covered and the ground firmly pressed down over the seed. The foregoing as well as other parts of the machine may be of the usual or any preferred construction and do not form a part of the present invention.

The attachment comprises a shovel supporting frame 6 consisting of a pair of transversely disposed parallel angle iron supporting bars 7 and 8 which are connected together and held in position by a pair of longitudinally disposed angle iron clamping bars 9, secured to the bars 7 and 8 by supporting bolts 10 which are engaged with slots 11 in the upper sides of the bars 7 and 8 whereby said clamping bars 9 may be adjusted toward or from each other. When the attachment is in position on the planter the supporting bars 7 and 8 are disposed adjacent to the rear side of the seed conducting tube 2 and the rear side of the brace 2′ thereof in which position said bars 7 and 8 are securely fastened by the clamping bars 9 which are drawn into tight engagement with the sides of the seed tube 2 and the brace 2′ by a series of clamping bolts 12 arranged through the upwardly extending sides or flanges of the bars 9 as shown. As the seed tube 2 is of considerably greater width than the thickness of the brace 2′ it will be noted that the clamping bars 9 do not extend parallel but converge or approach each other toward their forward ends.

In the front supporting bar 7 adjacent to its ends are formed series of bolt holes 13 of which there may be any desired number. In the rear supporting bar 8 near its ends are formed series of bolt holes 14 of which there may be any desired number. Adjustably secured to the ends of the front supporting bars 7 by attaching bolts 15 are the forward ends of combined plow beams and standards 16, said ends of the standards being adjusted laterally on the bar 7 by engaging the bolts 15 with the desired bolt hole 13 as will be readily understood. The plow beams and standards are adjustably secured to the ends of the rear supporting bar 8 by clips or clamping plates 17 and 18 which in turn are adjustably fastened to the bar 8 by clamping bolts 19 which are engaged with the bolt holes 14 on opposite sides of the bars 16 as shown. The plate 17 is bent or doubled upon itself in the form of a loop or bail and is engaged with the end of the bar 8 as shown. The parallel ends of the plate 17 have therein alined bolt holes with which the bolts 14 are engaged and by constructing the plate 17 in the manner described the looped end of the same may be adjusted beyond the end of the bar 8 to form an extension for the latter and to provide for the lateral adjustment of the plow beam and standard fastened thereby beyond the point at which the same may be adjusted on the bar 7. This additional adjustment for one of the beams and standards permits the formation of a wider furrow.

The combined beams and plows 16 are formed of flat spring metal bars and to the lower ends thereof are secured in any suitable manner any desired form of plows or shovels 20, said plows being here shown in the form of reversible double ended shovels or blades which are adapted to engage the ground on opposite sides of the furrow in such manner that any corn or seed dropped outside of the furrow will be pushed over into the center thereof so that the corn or plants will come up evenly or in line in the rows, thus insuring a good stand and permitting the plants to be thoroughly cultivated and kept clean from weeds. In addition to keeping the corn or seeds in the center of the furrow, the shovels 20 also throw up or elevate the ground along the center of the furrow directly over the planted seed and form small ditches on each side of the planted seeds by widening the furrow in some cases, especially where the furrows have been made with a lister, to a sufficient distance from the seeds to prevent their being washed out and to protect the seeds from standing water or sediment.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In an attachment for seed planters, a supporting frame adapted to be secured to the seed conducting tube and tube brace of the planter, combined plow beams and standards adjustably secured to said supporting frame, and plow shovels secured to said beams and standards in position to push the seed dropped by said tube into the center of the furrow and to elevate the ground directly over the planted seeds whereby the seed are prevented from being washed out.

2. An attachment for corn planters having furrow openers and seed conducting tubes, comprising a supporting frame consisting of parallel transversely disposed supporting bars, clamping bars adjustably secured to said supporting bars, clamping bolts engaged with said clamping bars whereby the latter are clamped into engagement with the seed tube and tube braces of the planter to hold said supporting bars in position, combined plow beams and standards adjustably secured to said supporting bars, and shovels secured to the lower ends of said combined beams and standards.

3. An attachment for seed planters comprising a pair of transversely disposed supporting bars having in their ends series of bolt holes, a pair of clamping bars adjustably secured to said supporting bars, bolts arranged through said clamping bars whereby they are clamped in operative engagement with the seed tube and tube brace of the planter to hold said supporting bars in operative position, combined spring plow beams and standards pivotally and adjustably bolted to the front supporting bar, clamping plates adjustably bolted to the rear supporting bar whereby the rear ends of said beams and standards are adjusted and held in their adjusted position, one of said plates being constructed in the form of a bail and having its bail shaped or looped end engaging the adjacent end of the supporting bar and adapted to be extended beyond said end of the bar to provide an extended support for the plow beam and standard engaged therewith and plow standards secured to the lower ends of said combined beams and standards.

In testimony whereof I have hereunto set my hand in presence of two subscribing witnesses.

RALEIGH A. SHAVER.

Witnesses:
DAVID B. ROGERS,
JOHN E. FROST.

Copies of this patent may be obtained for five cents each, by addressing the "Commissioner of Patents, Washington, D. C."